(12) United States Patent
Romansky et al.

(10) Patent No.: US 11,692,588 B2
(45) Date of Patent: Jul. 4, 2023

(54) BALL BEARING AND METHOD FOR MOUNTING A BALL BEARING

(71) Applicant: Minebea Mitsumi, Inc., Nagano (JP)

(72) Inventors: Fabian Romansky, Leutkirch (DE); Martin Engler, Leutkirch (DE)

(73) Assignee: Minebea Mitsumi, Inc., Nagano (JP)

(*) Notice: Subject to any disclaimer, the term of this patent is extended or adjusted under 35 U.S.C. 154(b) by 0 days.

(21) Appl. No.: 17/732,403

(22) Filed: Apr. 28, 2022

(65) Prior Publication Data

US 2022/0356908 A1 Nov. 10, 2022

(30) Foreign Application Priority Data

May 5, 2021 (DE) .......................... 102021204514.6
Apr. 20, 2022 (DE) .......................... 102022203851.7

(51) Int. Cl.
*F16C 33/38* (2006.01)
*F16C 33/41* (2006.01)

(52) U.S. Cl.
CPC ........ *F16C 33/3875* (2013.01); *F16C 33/412* (2013.01); *F16C 33/418* (2013.01); *F16C 2226/38* (2013.01)

(58) Field of Classification Search
CPC .. F16C 33/412; F16C 33/416; F16C 33/3875; F16C 33/3887; F16C 2226/36; F16C 2226/38; F16C 2226/40
See application file for complete search history.

(56) References Cited

U.S. PATENT DOCUMENTS

| 4,451,098 A * | 5/1984 | Farley ................. F16C 33/3875 384/526 |
| 5,131,762 A * | 7/1992 | Waskiewicz ............ F16C 33/44 384/526 |
| 2002/0081048 A1 | 6/2002 | Hoya et al. |

FOREIGN PATENT DOCUMENTS

| DE | 26 05 634 | 2/1976 |
| DE | 2605634 | 8/1977 |
| DE | 78 10 515 | 7/1978 |
| DE | 7810515 | 7/1978 |
| DE | 202010015674 U1 * | 5/2011 .......... F16C 33/3875 |
| DE | 102011079739 A1 | 1/2013 |
| DE | 10 2016 221 801 A1 | 12/2017 |

(Continued)

OTHER PUBLICATIONS

Search Report for German Patent Application 10 2021 204 514.6 dated Mar. 1, 2022.

*Primary Examiner* — Phillip A Johnson
(74) *Attorney, Agent, or Firm* — Farjami & Farjami LLP

(57) ABSTRACT

There is provided a ball bearing having a cage and balls held in the cage, the balls arranged one behind the other at a distance from one another in a circumferential direction about an axis of rotation of the ball bearing. The cage assembled from at least two cage parts joined to one another in a bonded manner and completely enclose the balls in a circumferential surface extending around the axis of rotation. A first cage part designed as a snap cage having axial webs projecting in the direction of the axis of rotation from a closed base ring and form ball pockets therebetween them, the first cage part encloses the balls along their outer circumference by more than 180°, holds the balls positively while forming an undercut and limits displacement of the balls within the circumferential surface in the direction of the at least one other second cage part.

16 Claims, 9 Drawing Sheets

(56) References Cited

FOREIGN PATENT DOCUMENTS

| DE | 102016221801 A1 | | 12/2017 | |
|---|---|---|---|---|
| DE | 10 2019 206 954 A1 | | 11/2020 | |
| DE | 102019206564 A1 | | 11/2020 | |
| EP | 2159037 B1 | | 3/2010 | |
| JP | 2002130295 A | * | 5/2002 | ............ F16C 33/416 |
| JP | 2005180666 A | | 7/2005 | |
| JP | 2006258178 A | * | 9/2006 | .......... F16C 33/3875 |
| JP | 2007040421 A | * | 2/2007 | .......... F16C 33/3875 |
| JP | 2007198583 | | 8/2007 | |
| JP | 2007198583 A | | 8/2007 | |
| JP | 2018-066433 | | 4/2018 | |
| JP | 2018066433 A | | 4/2018 | |

* cited by examiner

US 11,692,588 B2

BALL BEARING AND METHOD FOR MOUNTING A BALL BEARING

This application claims priority to German Patent Application Serial No. 102021204514.6, filed May 5, 2021, and German Patent Application Serial No. 102022203851.7, filed Apr. 20, 2022, which are hereby incorporated by reference into the present application.

The present invention relates to a ball bearing having a cage and a plurality of balls retained in the cage in accordance with the preamble of claim 1, and to a method for mourning a ball bearing having a bearing inner race, a bearing outer race, and balls.

In a deep groove ball bearing, as the present invention particularly relates to, the balls are in close contact with the raceways of the bearing inner ring and bearing outer ring on both sides, not only radially but also in the axial direction of the ball bearing, so that the bearing inner ring, bearing outer ring and balls cannot be displaced axially against each other, i.e. in the direction of the axis of rotation of the ball bearing. Although the deep groove ball bearing is designed to support predominantly radial forces, it can also support small axial forces. For example, the axial load capacity is at least approximately 10 percent of the radial load capacity. The bearing inner ring and the bearing outer ring thus each have two rims, i.e. two projections extending laterally next to the balls in the radial direction, which contact the balls and guide them axially, i.e. limit their mobility in the axial direction.

Due to the four rims, the balls cannot be inserted preassembled in cages, which are closed on both sides in the circumferential direction around the axis of rotation and in the direction of the axis of rotation, i.e. in the axial direction, into the space between the bearing inner ring and the bearing outer ring. Rather, the balls are first introduced without a cage between the bearing inner ring and the bearing outer ring, for example through a radial filling opening in the bearing inner ring and the bearing outer ring, for by eccentrically positioning the rings relative to each other, and distributed over the circumference, and then the bearing cage, which is then designed as a crown cage or snap cage, is inserted between the balls in the direction of the axis of rotation, i.e. axially. During insertion, axial webs, which rest on a closed base ring of the bearing cage, snap over the balls so that the balls snap into ball pockets formed between the axial webs. Due to this snapping or engaging of the balls in the cage, so that the balls are held positively with defined clearance in the cage in the circumferential direction and axial direction, these cages are referred to as snap cages; the designation crown cage relates to the crown-shaped design with the base ring and the axial webs extending from this in the axial direction, which in particular have a free end.

A disadvantage of such snap cages or crown cages is that in a ball bearing with high speeds, for example with 200,000 revolutions per minute and more, such as those particularly concerned by the present invention, the free ends of the axial webs can be bent outwards by the centrifugal force and thus impair the running behavior of the ball bearing and lead to increased wear.

Furthermore, unlike solid cages, which can be guided on two rims, such a crown cage is guided in the radial direction on only one rim, usually on one rim of the bearing inner ring, which leads to lower dynamic stability in operation compared with guidance on two rims. The structural mechanical stability of the crown cage is also reduced compared with a solid cage.

DE 10 2019 206 954 A1 therefore proposes a cage for a ball bearing that is assembled from two cage parts, which are mounted in the two-part mold and then joined together in a material bond by ultrasonic welding. Thus, a deep groove ball bearing can also be designed with a cage that is closed on both sides. A disadvantage of the above-mentioned embodiment is that the two cage parts, which can be designed identically to each other, cannot each hold the balls in the axial direction in a form-fit manner, as was the case with conventional snap cages. The positioning of the parting lines in the axial center of the ball pockets, thus in the circumferential direction to the balls arranged one behind the other, also favors wear, since the ball pockets wear most ire the circumferential direction.

DE 10 2016 221 801 A1 also discloses a corresponding cage composed of two cage parts with parting lines positioned between the two cage parts in the circumferential direction to the balls.

DE 78 10 515 U1 and DE 26 05 634 A1 disclose bearing cages made of welded plastic for spherical roller bearings.

JP 2007 198583 A, JP 2018 66433 A, and JP 2005 180 666 A show other bearing cages made of two parts joined together. US 2002/0081048 A1 discloses a rolling bearing having cage part with claws and a retaining ring.

The present invention based on the object of specifying a ball bearing and a method for mounting a ball bearing, wherein the cage of the ball bearing is closed on both sides in the axial direction, the ball bearing is particularly wear-resistant and suitable for high speeds, and the ball bearing can also be designed as a deep groove ball bearing.

The object according to the invention is solved by a ball bearing and a method according to the independent claims. The dependent claims describe advantageous and particularly useful designs of the invention.

A ball bearing according to the invention has a cage and a plurality of balls held in the cage, which are arranged one behind the other and at a distance from one another in a circumferential direction about an axis of rotation of the ball bearing. The cage is assembled from at least two cage parts, preferably from exactly two cage parts, which are joined to one another in a materially bonded manner by welding, in particular ultrasonic welding, and/or bonding and completely enclose the balls within a (virtual) circumferential surface extending around the axis of rotation. Thus, the cage is closed at both axial ends in the axial direction, which corresponds to the direction of the axis of rotation of the ball bearing.

Laser transmission welding is another advantageous materially bonded connection of the two cage parts.

According to the invention, the first cage part, is designed as a snap-in cage part and thus has axial webs projecting in the direction of the axis of rotation from a closed base ring, which form ball pockets between them so that the cage can be pushed in and snapped in between the balls located between a bearing inner ring and a bearing outer ring, wherein the balls engage between the axial webs. The first cage part can thus also be referred to as a crown cage part, and the axial webs in particular have free ends facing away from the base ring. The first cage part encloses the balls along their outer circumference by more than 180°, within said circumferential surface, holds the balls positively while forming an undercut and thus limits displacement of the balls within the circumferential surface in the direction of the at least one other cage part, i.e. the second cage part. Positive retaining means in particular the holding of the balls with a defined clearance in the cage, so that the balls are movable or displaceable over a comparatively small area within the cage.

According to one embodiment of the invention, only the first cage part has guide surfaces for the balls, against which the balls rest directly, at least temporarily. The second cage part thus serves only to stabilize the first cage part and is positioned at a distance from the balls. In such an embodiment, the second cage part can, for example, be designed as a largely flat ring which, however, has in particular axial projections which engage in axial recesses of the first cage part, or which has axial recesses in which axial projections of the first cage part engage.

According to an alternative embodiment, the first cage part and the second cage part have guide surfaces for the balls, against which the balls bear directly at least temporarily, wherein the guide surfaces in the first cage part, however, are larger than the guide surfaces in the second cage part and extend in particular by more than 180° along the outer circumference of the respective ball, again within said circumferential surface. In such an embodiment, a particularly harmonious, vibration-reduced guiding of the balls can be achieved.

Particularly preferably for the connection by ultrasonic welding, one of the cage parts, in particular the second cage part, has energy directors or axial projections which engage in recesses in the other cage part, in particular in the first cage part, wherein the recesses form melt pans for material melted by the ultrasonic welding. This prevents material from escaping outwardly from the cage parts and interfering with precise contact of the cage with the bearing inner ring or bearing outer ring.

If the joint between the at least two cage parts, in particular exactly two cage parts, is produced by laser transmission welding, the heating for welding the cage parts takes place by absorption of the laser beam energy in at least one of the two cage parts, preferably exactly in a single cage part. The material of at least one cage part is transparent to the laser beam, at least such that the laser beam can penetrate through the cage part to the welding point. In particular, the other cage part absorbs the energy of the laser beam at the welding point, so that the energy of the laser beam is converted into heat near the joint or welding point, which locally melts the components involved or their materials and produces the desired material bond after cooling. Preferably, the component/cage part has a smaller wall thickness for the laser beam to penetrate than the component that is transparent to the laser beam.

The second cage part can preferably be held positively in the first cage part in the circumferential direction around the axis of rotation and in the radial direction to the axis of rotation, or the first cage part can preferably be held positively in the second cage part in the circumferential direction around the axis of rotation and in the radial direction to the axis of rotation. In this way, a particularly exact centering of the two cage parts relative to each other can be achieved. For example, the first cage part has radial projections that engage in radial recesses in the second cage part, and/or the second cage part has radial projections that engage in radial recesses in the first cage part.

Particularly preferably, the first cage part rests with a radially outer or radially inner contact surface against a radially inner or radially outer contact surface of the second cage part. This achieves the desired radial guidance.

According to an alternative embodiment, the first cage part rests with contact surfaces extending in the direction of the axis of rotation and obliquely to the radial direction on opposite contact surfaces of the second cage part. In an axial plan view of the first cage part, the axial webs can thus form conical gaps between them, the side walls of which extend obliquely to a radial direction of the ball bearing. This also achieves positive retention of the second cage part in the circumferential direction around the axis of rotation and at the same time in the radial direction to the axis of rotation in the first cage part.

According to one embodiment of the invention, in which the first cage part forms an inner rim guide or outer rim guide of the cage on the bearing inner ring or bearing outer ring, the first cage part preferably extends along the entire extension of the cage in the direction of the axis of rotation. Thus, the inner rim guide or the outer rim guide is not interrupted by a parting line between e first cage part and the second cage part.

Particularly preferably, the ball bearing comprises a bearing inner ring and a bearing outer ring, each of which forms a raceway on which the balls roll, wherein the ball bearing is designed as a radial bearing or radial axial bearing, in particular as a deep groove ball bearing having two rims on the bearing inner ring and two rims on the bearing outer ring. Such a bearing is also suitable for particularly high speeds and can be manufactured inexpensively in comparison with bearings in which a rim on the inner ring and/or on the outer ring is changed to a cone geometry or is completely missing and is subsequently replaced by projections or cones or the like.

A method for mounting a ball bearing according to the invention provides for positioning of the balls on the raceways between the bearing inner ring and the bearing outer ring, followed by insertion of the first cage part in the direction of the axis of rotation, i.e. in the axial direction, of the ball bearing, wherein the axial webs are pushed respectively between two balls arranged adjacent to one another in the circumferential direction and the balls snap into place in the ball pockets. The first cage part and the second cage part are then joined together in the direction of the axis of rotation, i.e. axially, and joined to one another by adhesive bonding and/or welding, in particular ultrasonic welding.

If an embodiment with energy directors is provided on the first cage part and/or on the second cage part, energy introduced by vibrations can be focused with the energy directors in order to melt the material of the respective other cage part locally in a targeted manner. At the same time, the material at the free ends of the energy directors can be melted. Preferably, thermoplastics, for example PEEK (polyetheretherketone), can be considered as materials. However, other materials, in particular plastics such as preferably thermoplastic polymers, are possible.

The provision of a melt pool has the advantage that the melt is collected at a predetermined position and outflow from the contact surfaces between the first cage part and the second cage part is avoided. As a result, a homogeneous weld seam can be produced which has higher strength, and uncontrolled expulsion of cooled melt which protrudes from the two cage parts over a defined area of the seam and can impair the functionality of the cage is avoided.

During joining, the guidance of the two cage parts in the radial direction and in the circumferential direction relative to each other during the welding process ensures that the seam areas of both cage parts do not move relative to each other and thus impair the welding process and the welding result. By limiting the other directions of movement and inclination, only axial movement toward each other is enabled, as well as axial oscillatory movement, which is advantageous for the proposed ultrasonic welding. Furthermore, the guidance ensures that the two cage parts are welded in a precisely provided position relative to each other, preventing interference with the functionality of the cage.

Particularly preferably, the guidance in the radial direction and in the circumferential direction between the two cage parts takes place when joining the cage parts radially on the inside of the second cage part and radially on the outside of the first cage part, respectively, in order to achieve self-reinforcement against the expansion of the first cage part at high speeds of the ball bearing. The cage is then preferably guided on the rims of the bearing ring with the first cage part on the bearing inner ring so that the function of the cage guided on the inner rim is not impaired by interfaces between the two cage parts.

Preferably, a frequency in the range between 20 kHz and 70 kHz is selected for ultrasonic welding. The vibrations applied to the cage part by ultrasonic welding cause elastic deformation of the cage part material and cause friction between the molecules. Furthermore, friction occurs between the contact surfaces of the two cage parts, which together with the molecular friction leads to heat generation with inciting of the cage material. Preferably, a comparatively short cooling phase is provided in which the two cage parts are pressed against each other under pressure to allow the molten material to solidify homogeneously.

Particularly preferably, the energy input is limited to a comparatively small contact area between the two cage parts. This makes it possible to melt, the material of the cage in narrowly defined local areas with a comparatively small energy input.

According to one embodiment, as disclosed herein, energy directors are provided in at least one of the cage parts, wherein such energy directors form a linear or point contact surface between the two cage parts and are generally configured as a tip on one of the two cage parts. The tip can then melt and distribute evenly around the projection carrying the tip between the first cage part and the second cage part, where it solidifies in a melt pool. For example, the tip is V-shaped before melting.

According to an alternative embodiment, a plurality of V-shaped recesses is provided in one of the two cage parts, the first and/or the second cage part, with an axial projection of the other cage part having an at least substantially flat end face dipping into one V-shaped recess in each case. This also achieves linear contact areas between the two cage parts, which can then be melted to allow further immersion of the two cage parts in one another and to catch the melt in the recess and allow it to solidify.

During melting, the two cage parts can be advantageously pressed onto each other. By melting the energy directors when the contact pressure is applied, the two cage parts can reach their geometrically required final position.

The material of the cage parts can preferably be fiber-reinforced. However, this is not mandatory.

Melting of the cage material by ultrasonic welding, for example, can be achieved with an energy input over 150 to 550 milliseconds.

For example, the amplitude of the vibration is between 5 μm and 50 μm.

Laser transmission welding does not require special geometries such as energy directors and/or melt pools. According to one embodiment, a cage part may be designed as a simple disk without defined elevations, depressions or similar geometries. For example, a cage part has the shape of a flat circular ring disk.

The cage parts can be positioned radially and, if necessary, circumferentially relative to each other, for example by an alignment device, and can be pressed onto each other in the axial direction or just placed on top of each other to minimize and/or close the gap between the cage parts. Subsequently, the cage parts can be joined together by laser transmission welding, as explained.

To weld the cage parts together at the various welding points, the laser beam can be directed sequentially or laser beams can be directed in parallel to the various welding points. Welding distortion can be minimized or avoided by a specific sequence of welds, for example alternating or star-shaped over the radius, i.e. no welds immediately adjacent to one another are welded immediately one after the other in the circumferential direction. Simultaneous welding of different or all welds also avoids welding distortion.

Welding without switching the laser beam on and off is also possible. In this case, the laser beam can be guided on a circular, continuous path from welding point to welding point, with the path extending correspondingly through the planned welding points. In the planned welding points, a material bond is achieved after cooling of the materials involved, whereas in the gaps created by the ball pockets, no melt is generated and no change is caused in the rolling element located in the ball pocket.

The invention will be described below by way of exemplary embodiments and the figures, wherein.

Figure 1:
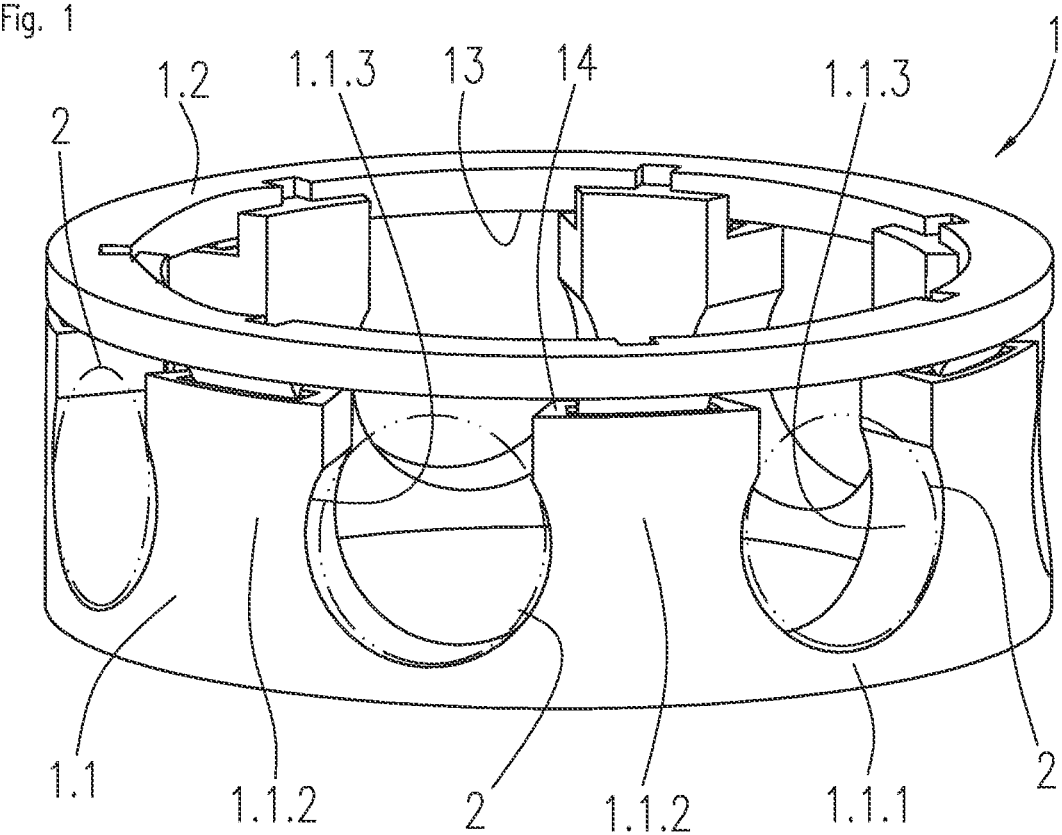
FIG. 1 shows a first exemplary embodiment of a ball bearing according to the invention having a two-piece cage before the complete joining and welding of the cage parts.

FIG. 1 shows an exemplary embodiment of a ball bearing according to the invention, comprising a cage 1 assembled from a first cage part 1.1 and a second cage part 1.2. The first cage part 1.1 has a base ring 1.1.1 closed in the circumferential direction around the axis of rotation of the ball bearing and axial webs 1.1.2 standing thereon in the axial direction, i.e. in the direction of the axis of rotation, arranged at a distance from one another in the circumferential direction, which form ball pockets 1.1.3 between them, in which balls 2 are held positively with defined clearance. The balls 2 are only shown schematically by dashed lines. The first cage part 1.1 is designed as a snap cage part so that the balls 2 snap into the ball pockets 1.1.3 in the axial direction when the first cage part 1.1 is pushed in between a bearing inner ring and bearing outer ring not shown here.

The second cage part 1.2 is designed essentially as a flat ring, having a contact surface 13 extending in the radial direction and circumferential direction, which is closed over the circumference, against which end faces 14 of the axial webs 1.1.2 rest snugly in the fully joined state of the two cage parts 1.1 and 1.2.

Figure 2:
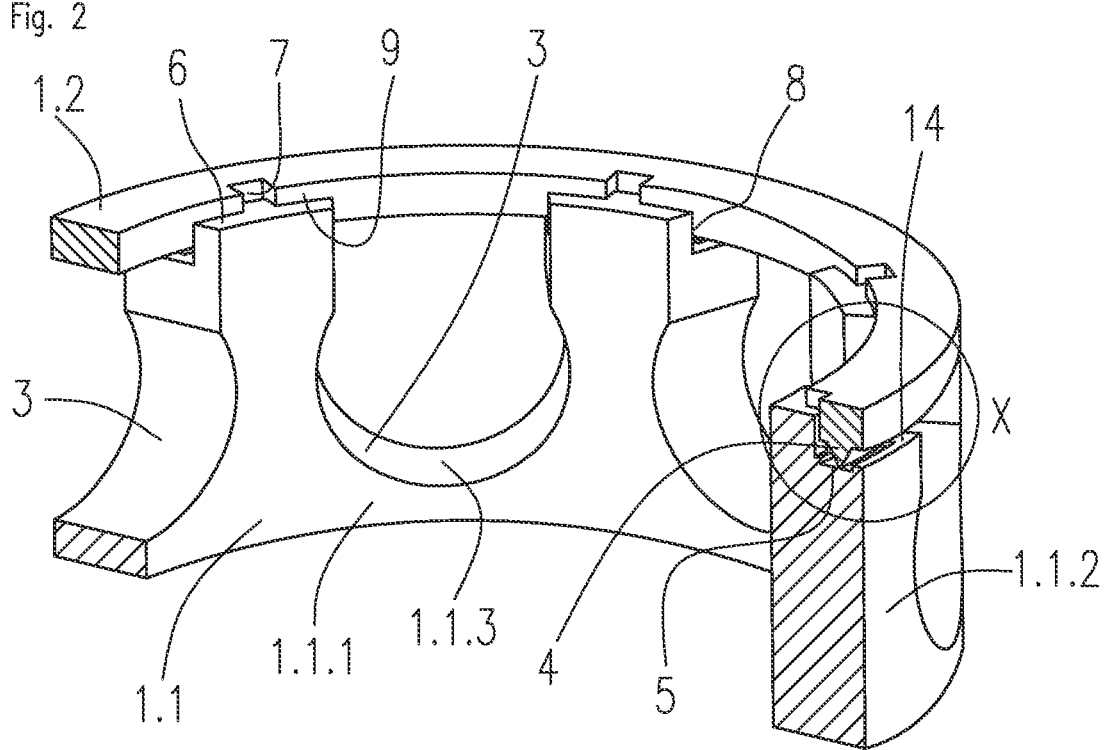
FIG. 2 shows an axial section through the cage from FIG. 1.
Figure 3:
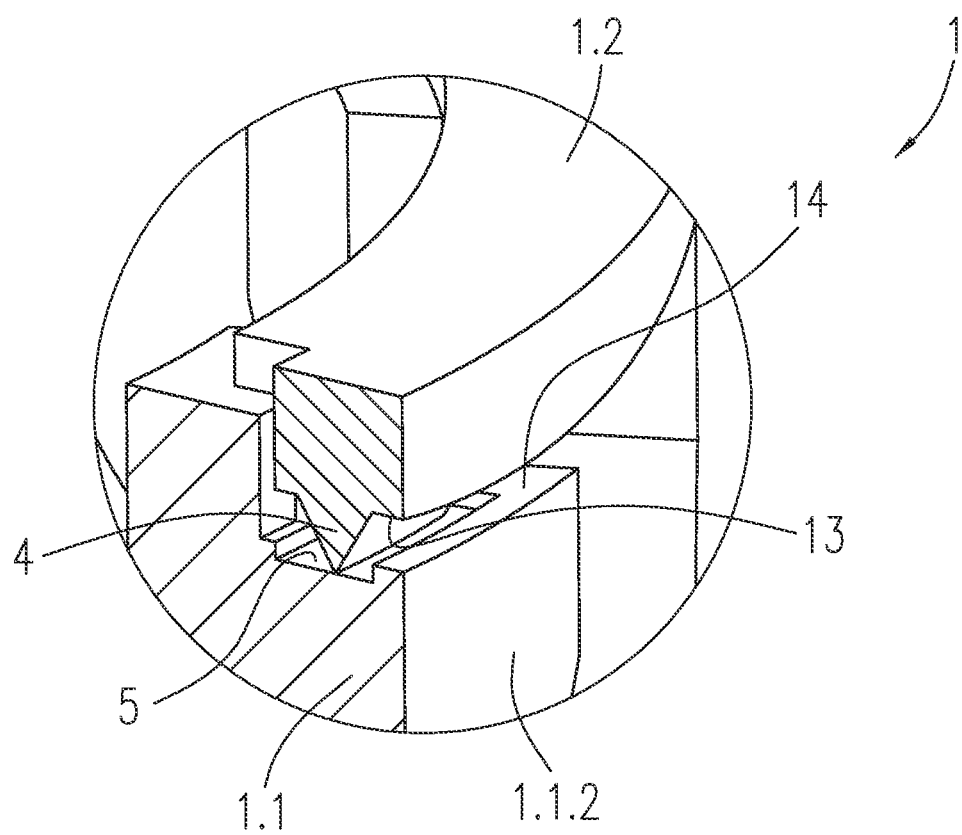
FIG. 3 shows an axial section through the cage from FIG. 1 in the area of an energy director and the associated recess with melt pool.
Figure 4:
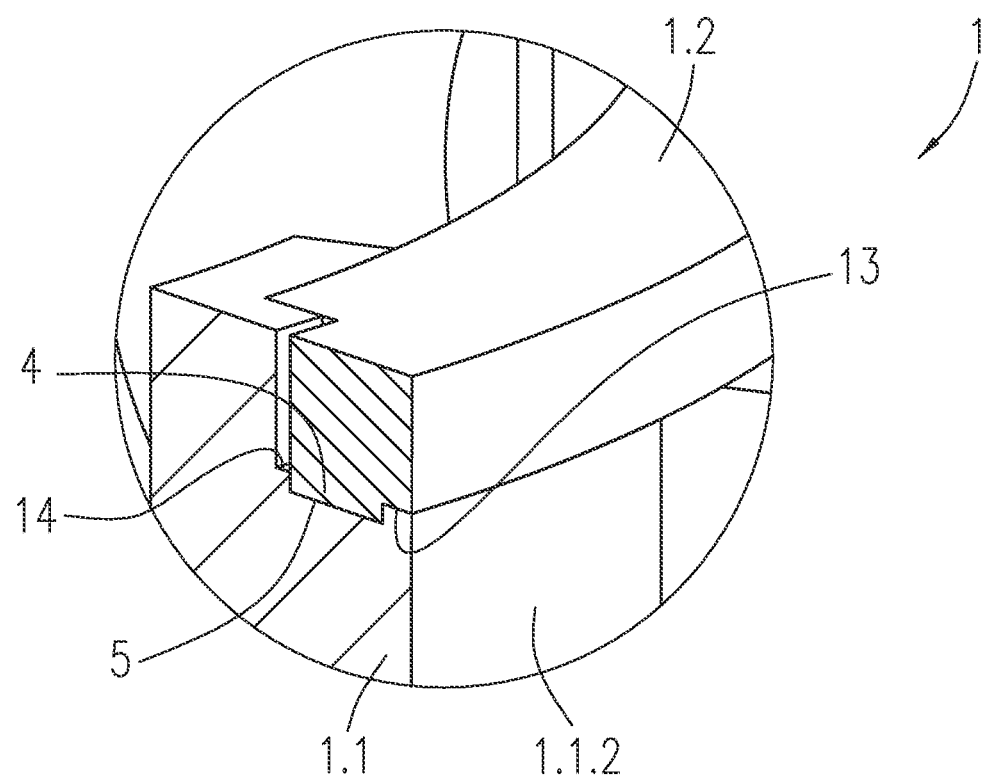
FIG. 4 shows the melt pool from FIG. 3 in the fully welded and joined state of the two cage parts.

As can be seen in particular from FIGS. 2 and 3, the end faces 14 have recesses 5 into which energy directors 4, which project from the contact surface 13, engage when the two cage parts 1.1, 1.2 are joined. The energy directors 4 are wedge-shaped, so that a line contact is achieved at the bottom of the recesses 5, The energy directors 4 do not completely fill the recesses 5, so that each recess 5 forms a melt pool for molten material. When the two cage parts 1.1, 1.2 are welded together, melting material from the energy directors 4 and from the bottom of the recess 5 collects in the recess 5, and at the same time the second cage part 1.2 is displaced further towards the first cage part 1.1 in the axial direction until the contact surface 13 comes to rest against the end faces 14. This condition is shown in FIG. 4. The melted material forms a full-surface seam between the remaining projection of the energy director 4 and the bottom and side walls of the recess 5, as well as optionally between the contact surface 13 and the end faces 14.

To center the two cage parts 1.1, 1.2 against each other during joining, the first cage part 1.1 has a radially outer contact surface 8 and the second cage part 1.2 has a radially inner contact surface 9, wherein the two contact surfaces slide along each other during joining. Furthermore, the first cage part 1.1 has radial projections 6 which engage in radial recesses 7 in the second cage part 1.2. This provides guidance in the circumferential direction or mutual alignment of the axial webs 1.1.2 and the second cage part 1.2.

In the exemplary embodiment shown, the first cage part 1.1 extends with its radially inner surface over the entire axial extension of the cage 1 to form an uninterrupted inner rim guide for the cage 1 on a bearing inner ring (not shown). However, this is not mandatory.

Furthermore, according to the exemplary embodiment shown in FIGS. 1 to 5, only the first cage part 1.1 forms guide surfaces 3 for the balls 2. The second cage part 1.2 has no guide function for the balls 2 and is arranged at a distance from the balls 2.

Figure 5:
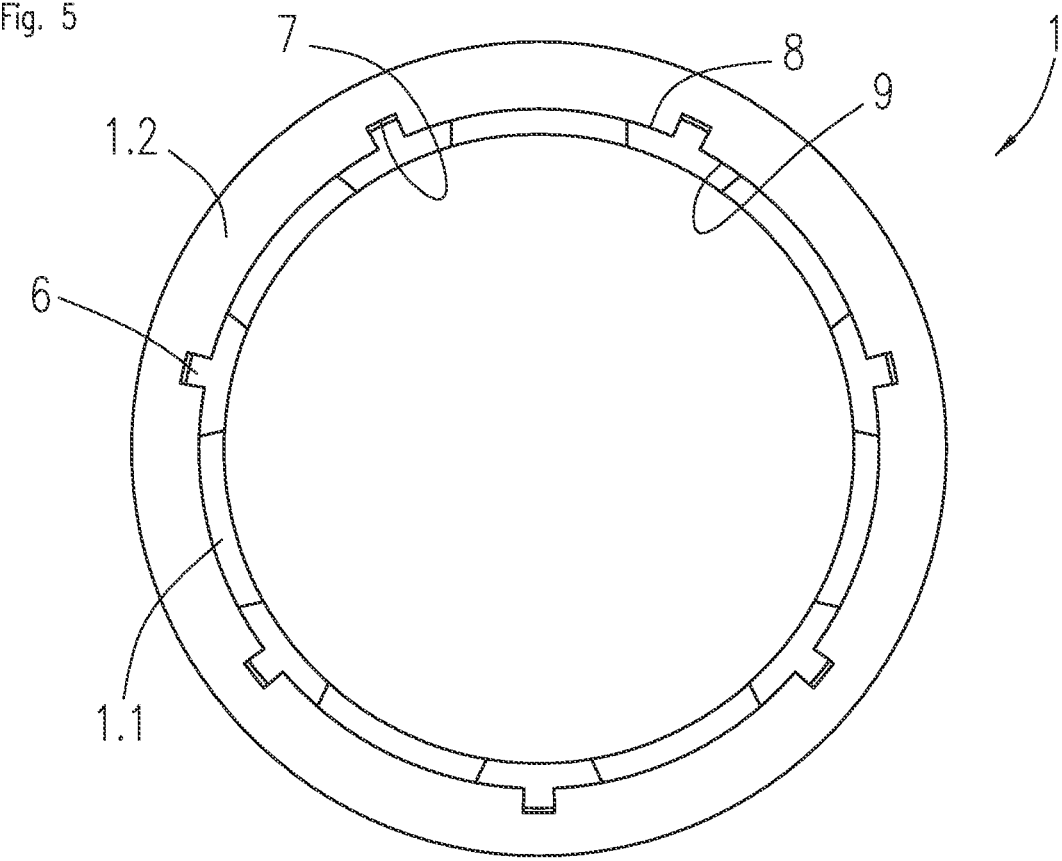
FIG. 5 shows an axial plan view of the cage from FIG. 1 in the fully welded and joined state.

In FIG. 5, a schematic frontal plan view of the second cage part 1.2 in the fully joined state shows once again how the second cage part 1.2 is held positively in the first cage part 1.1 in the circumferential direction about the axis of rotation of the ball bearing and in the radial direction to the axis of rotation of the ball bearing by the contact surfaces 8, 9 as well as the radial projection 6 and the radial recess 7.

Figure 6:
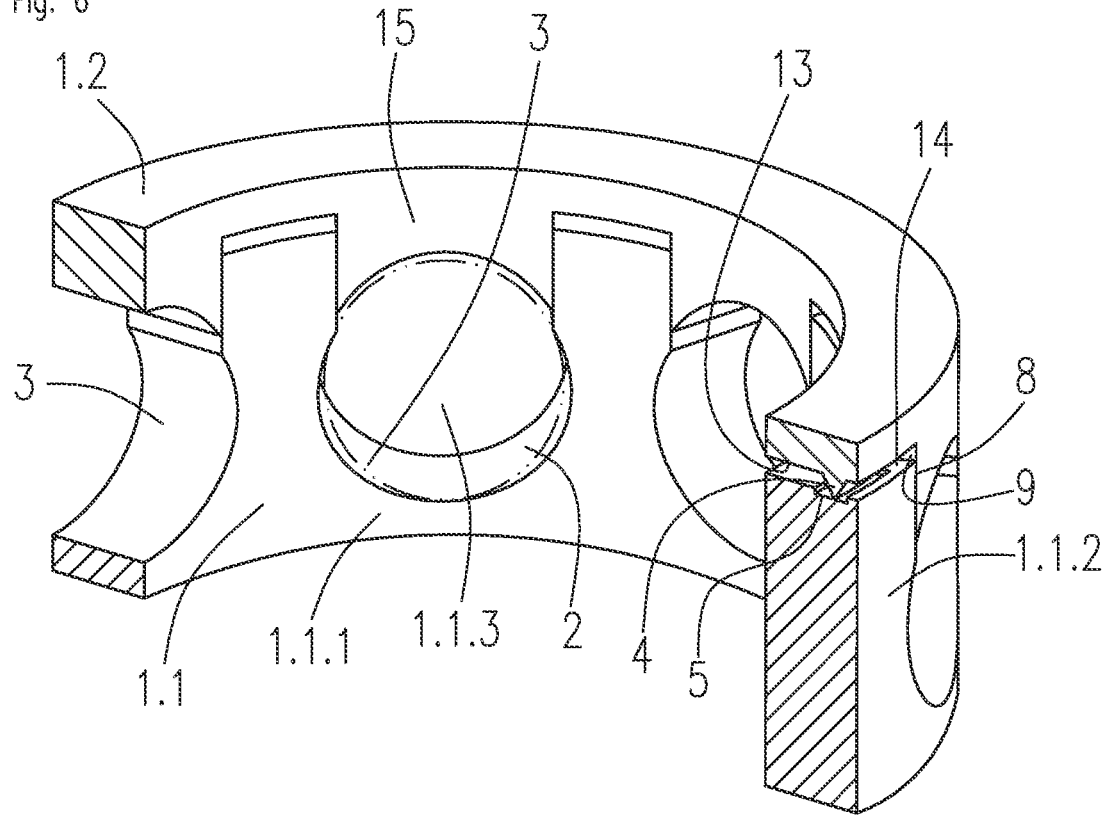
FIG. 6 shows a second exemplary embodiment of a two-piece cage in an axial section.
Figure 7:
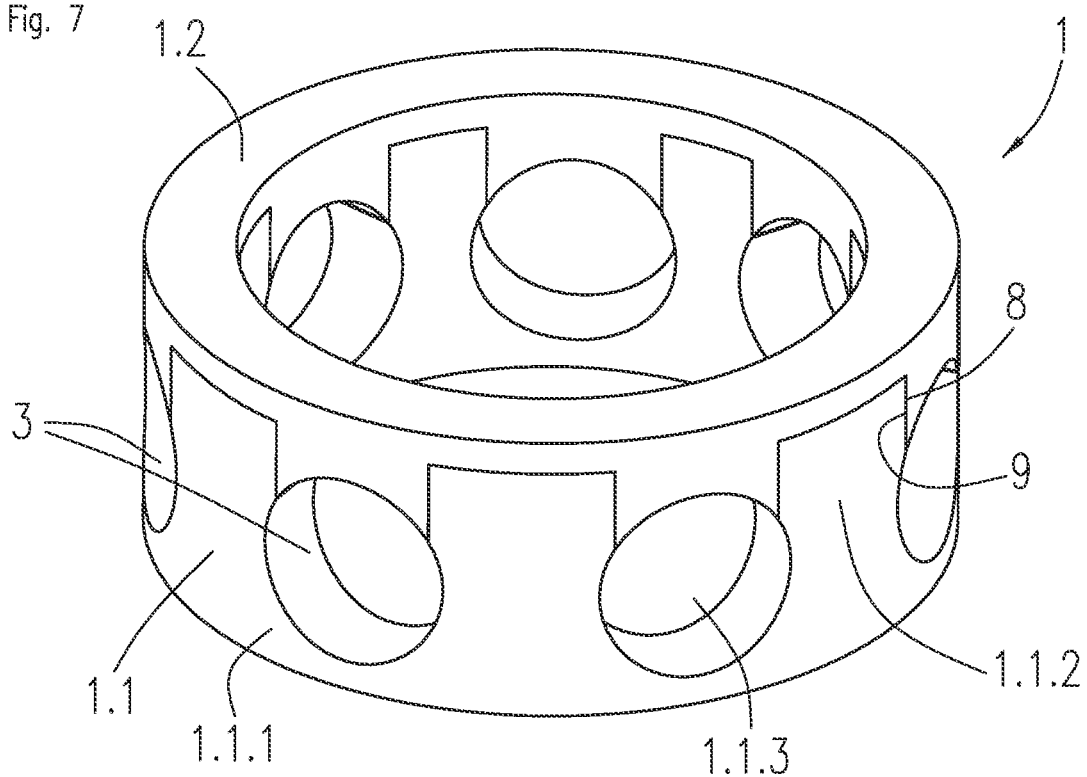
FIG. 7 shows the two-part cage from FIG. 6 in the fully welded and joined state of the two cage parts.
Figure 8:
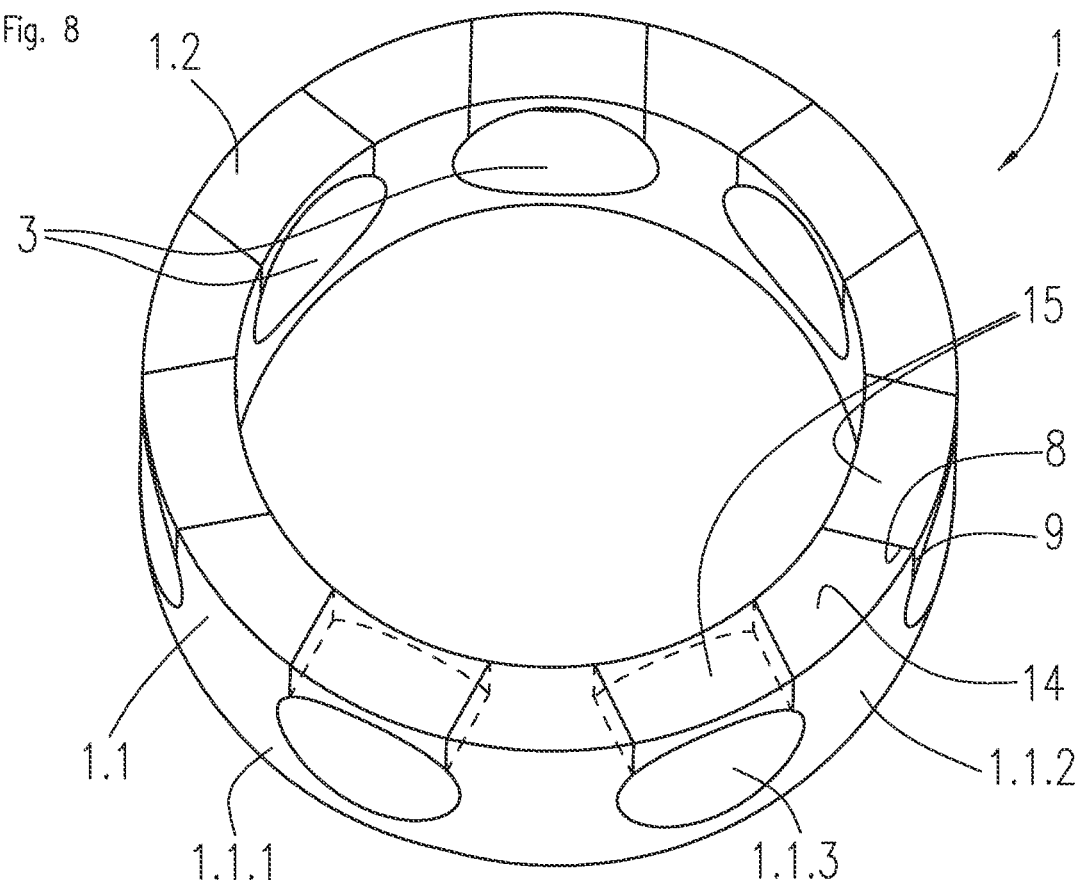
FIG. 8 shows a radial section through the cage of FIG. 7.

A second exemplary embodiment shown in FIGS. 6 to 8 differs from the first exemplary embodiment in that both the first cage part 1.1 and the second cage part 1.2 form guide surfaces 3 for the balls 2. The second cage part 1.2 also has axial webs 15 which dip in the circumferential direction between the axial webs 1.1.2 in the first cage part 1.1 and, together with the axial webs 1.1.2, delimit the ball pockets 1.1.3.

Furthermore, the embodiment differs in the form of the positive fit in the circumferential direction about the axis of rotation and in the direction to the axis of rotation between the second cage part 1.2 and the first cage part 1.1, as can be seen in particular from FIG. 8. FIG. 8 shows a radial section along the end faces 14 of the axial webs 1.2.2 of the first cage part 1.1.

The intermediate spaces bounded by the axial webs 1.1.2 in the circumferential direction are conical in plan view, in the contact surfaces 8, 9 extend in the direction of the axis of rotation of the ball bearing, i.e. the axial direction, and obliquely to the radial direction.

For the rest, reference can be made to the description of FIGS. 1 to 4, wherein corresponding components are provided with corresponding reference signs.

Figure 9:
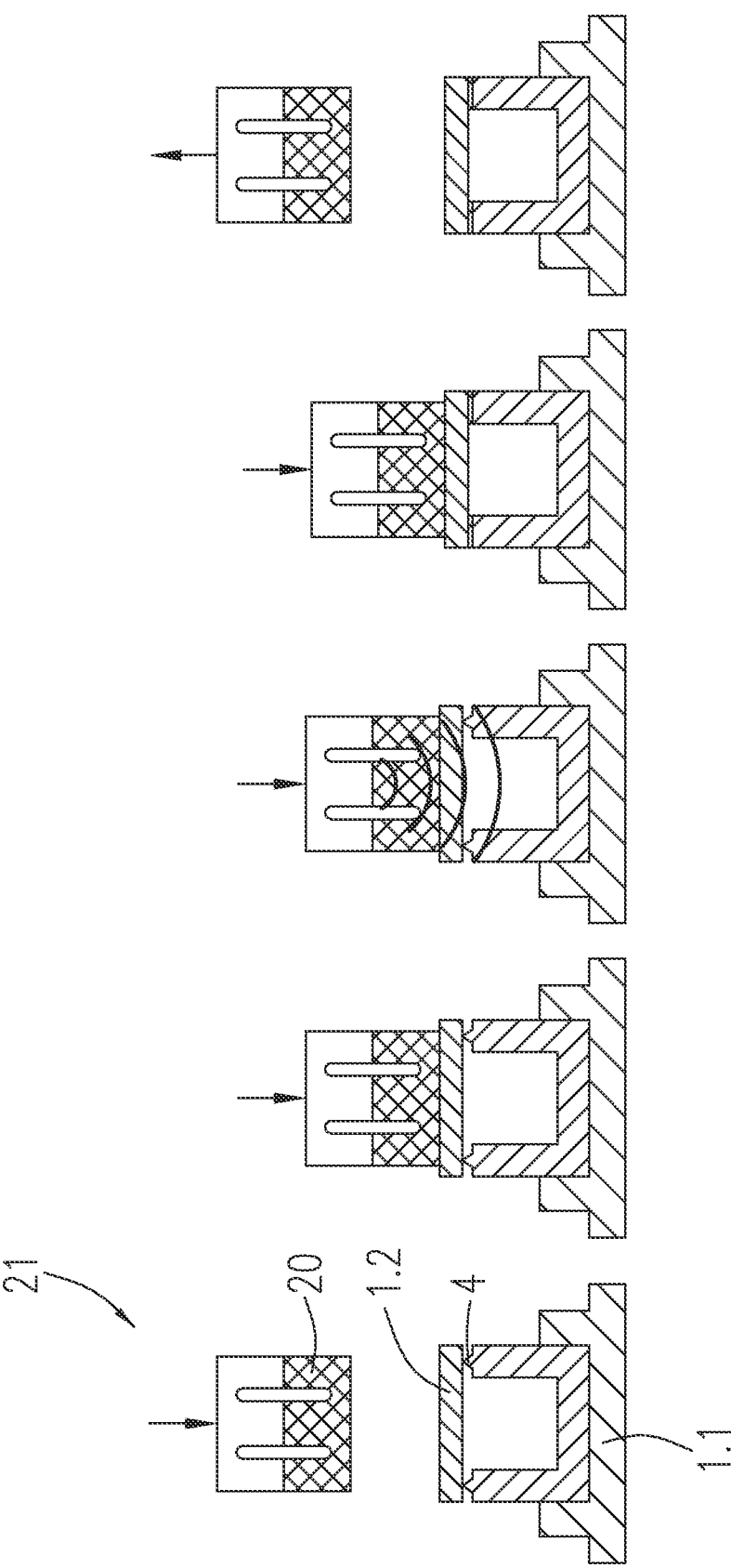
FIG. 9 shows a schematic representation of a method according to the invention.

FIG. 9 schematically shows a method for mounting a ball bearing according to the invention as shown in FIGS. 1 to 8, but without the balls positioned between a bearing inner ring and a bearing outer ring. Rather, only the joining and welding of the first cage part 1.1 and the second cage part 1.2 is shown. The two cage parts 1.1, 1.2 are positioned on top of each other in the axial direction, as shown for example in FIGS. 1 and 6. Subsequently, the sonotrode 20 of an ultrasonic welding device 21 is positioned on the second cage part 1.2 and ultrasound is introduced into the second cage part 1.2 via the sonotrode 20. This melts the material of the energy director 4 and, if necessary, adjacent material of the other cage part to produce the welded joint. A pressure in the axial direction is maintained until the material has solidified. The sonotrode 20 can then be lifted off.

FIG. 9 shows that the energy directors 4 are arranged on the first cage part 1.1. This is also possible in the embodiments shown in FIGS. 1 to 8. However, the energy directors 4 can just as well be arranged on the second cage part 1.2, which is favorable in terms of energy introduction.

Figure 10:
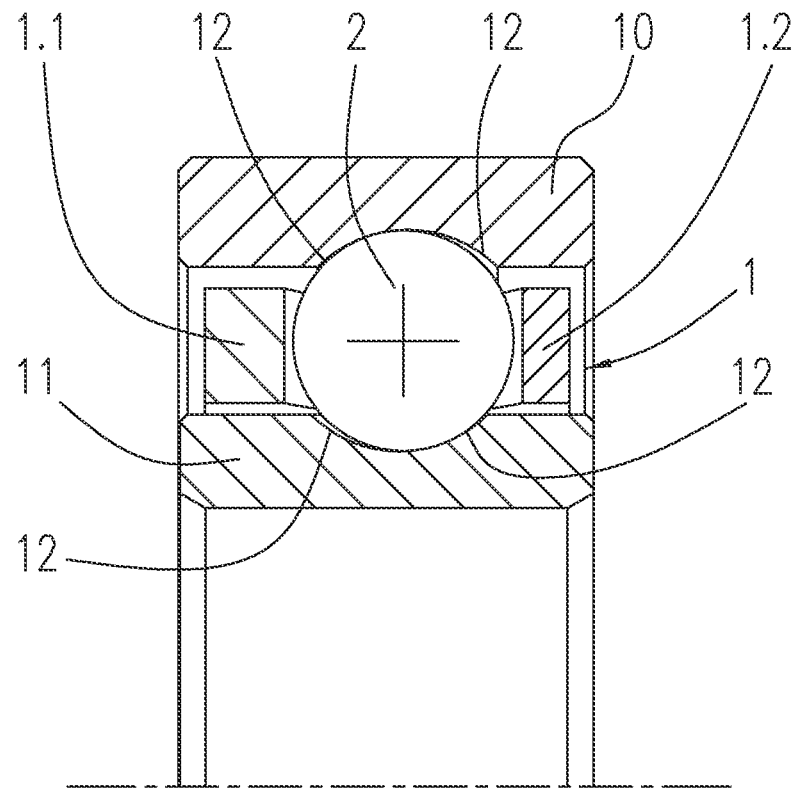
FIG. 10 shows a schematic representation of a ball bearing according to the invention with bearing inner ring and bearing outer ring.

FIG. 10 schematically shows a ball bearing according to the invention, which is designed as a deep groove ball bearing. Accordingly, the bearing inner ring 10 and the bearing outer ring 11 each have two rims 12, so that the balls are guided not only in the radial direction but also in the axial direction on both sides on the raceways of the bearing inner ring 10 and the bearing outer ring 11. Furthermore, the balls 2 are guided in the cage 1.

Figure 11:
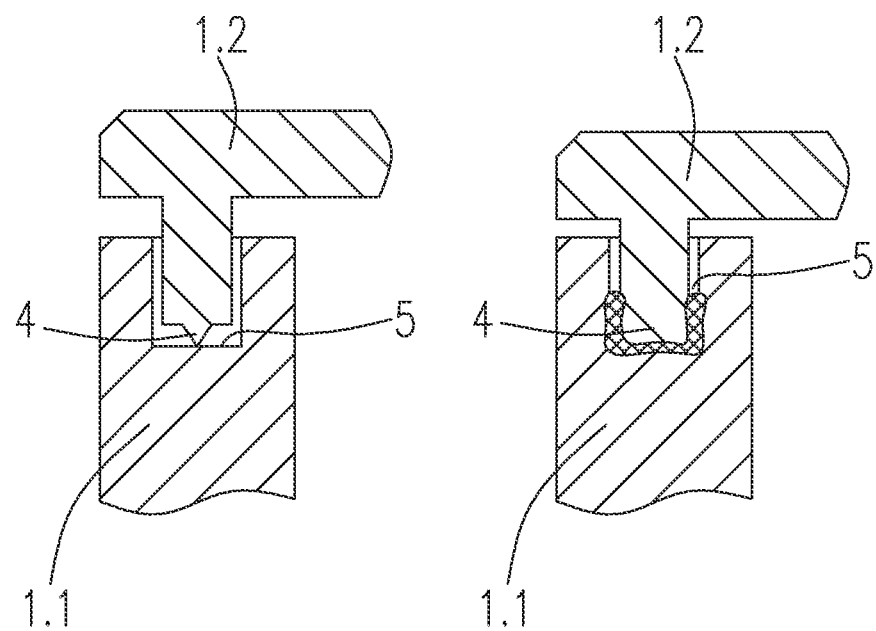
FIG. 11 shows the melting of an energy director in a melt pool.

FIG. 11 again schematically shows how the material at the tip of the energy director 4 and adjacent material in the recess 5 melt to form the connecting seam between the first cage part 1.1 and the second cage part 1.2. At the same time, the recess 5 forms such a melt pool that the melted material does not escape unintentionally between the first cage part 1.1 and the second cage part 1.2.

Figure 12:
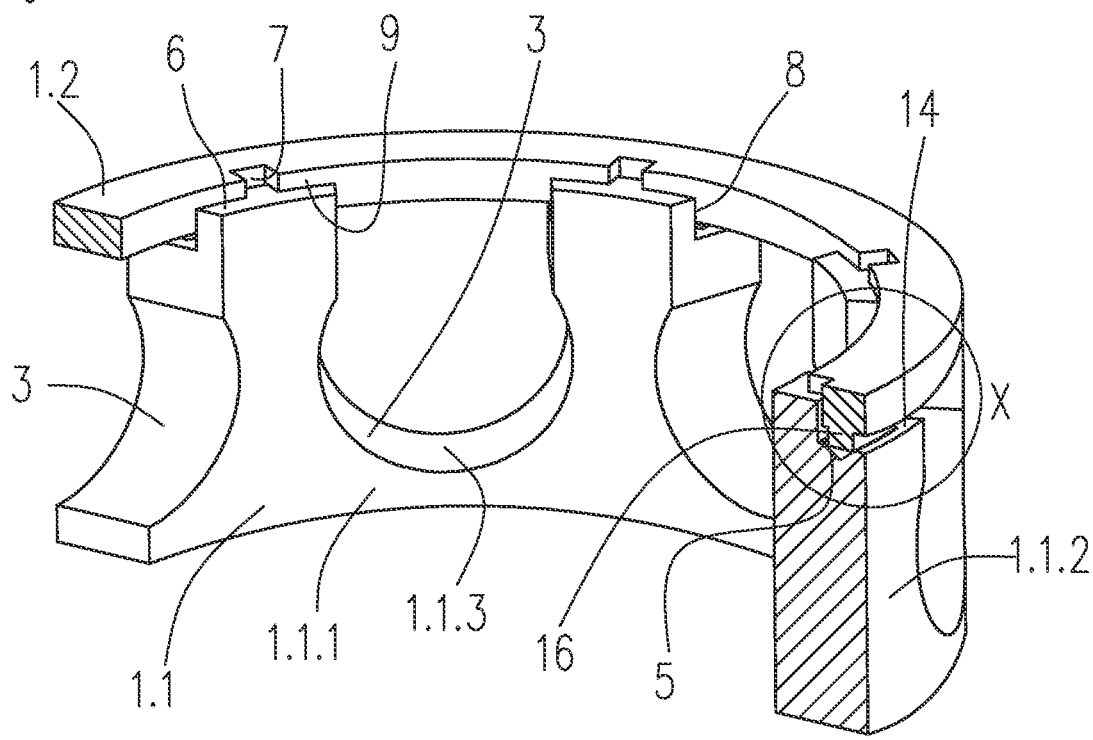
FIG. 12 shows an embodiment without an energy director.
Figure 13:
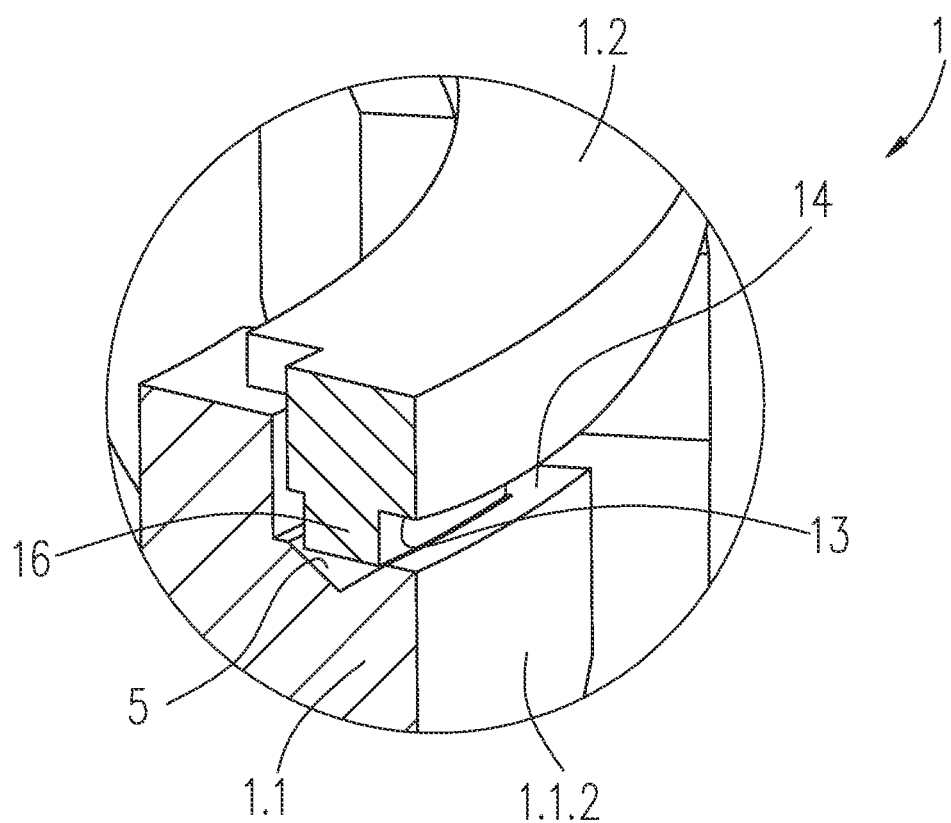
FIG. 13 shows the melt pools of the embodiment from FIG. 12 in an oblique plan view.

In the exemplary embodiment according to FIGS. 12 and 13, the cage parts 1.1 and 1.2 manage without an energy director. Axial projections 16 on the second cage part 1.2 have a largely flat end face and form linear contact surfaces with the recesses 5, which are V-shaped in axial section through the first cage part 1.1. This also results in linear vibration transmission between the first cage part 1.1 and the second cage part 1.2.

In the exemplary embodiment according to FIGS. 12 and 13, as in the other exemplary embodiments of FIGS. 1 to 11 the recesses 5 could be provided in the second cage part 1.2 and corresponding projections in the first cage part 1.1.

Figure 14:
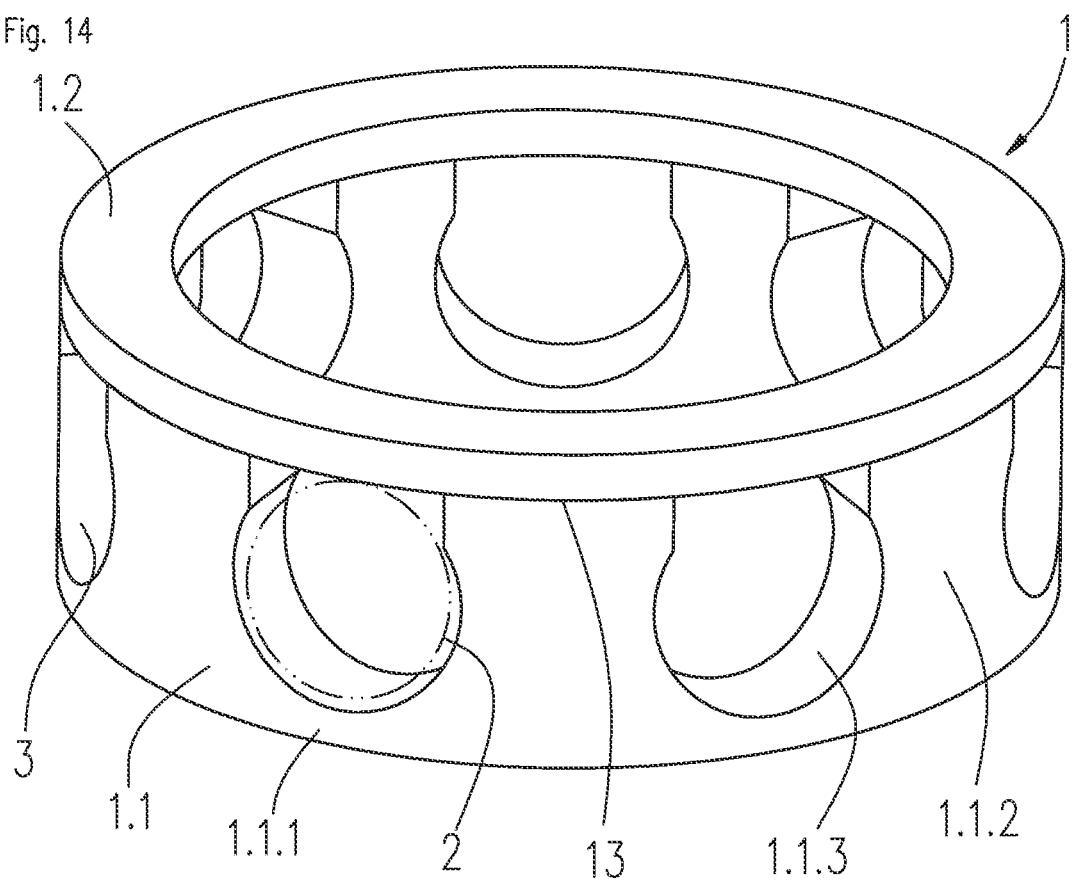
FIG. 14 shows another exemplary embodiment of a two-part cage in the welded state of the two cage parts.
Figure 15:
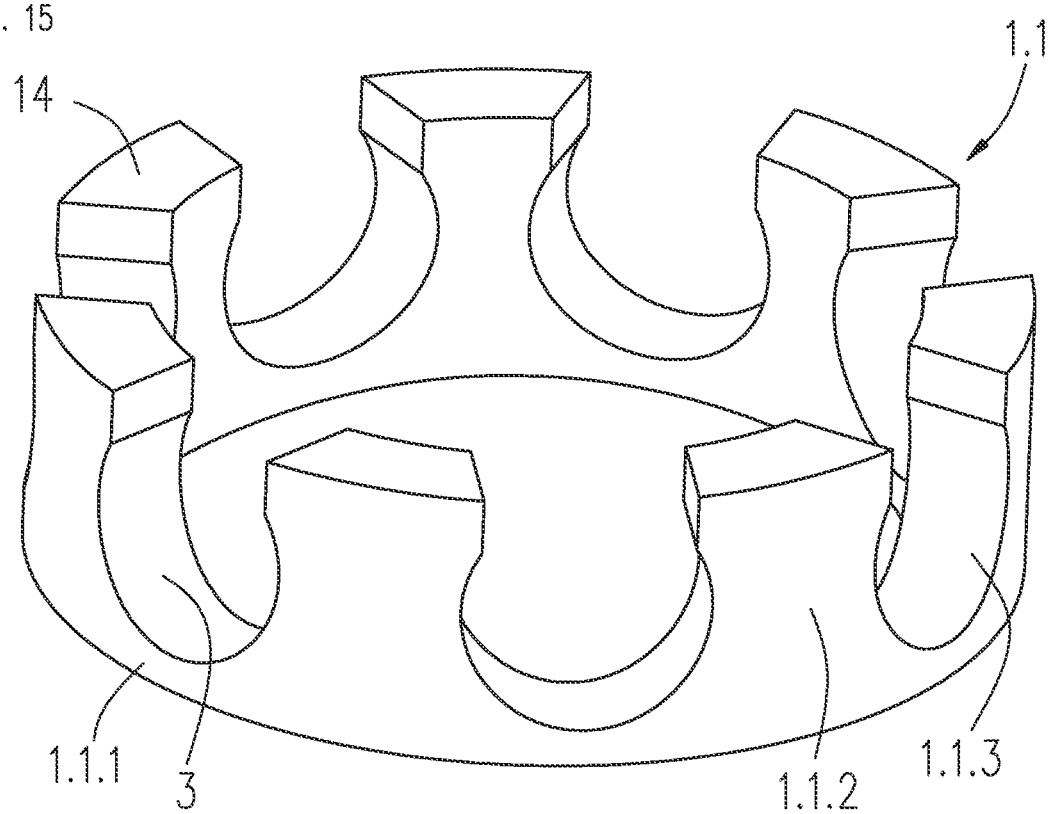
FIG. 15 shows the first cage part of the cage of FIG. 14.
Figure 16:
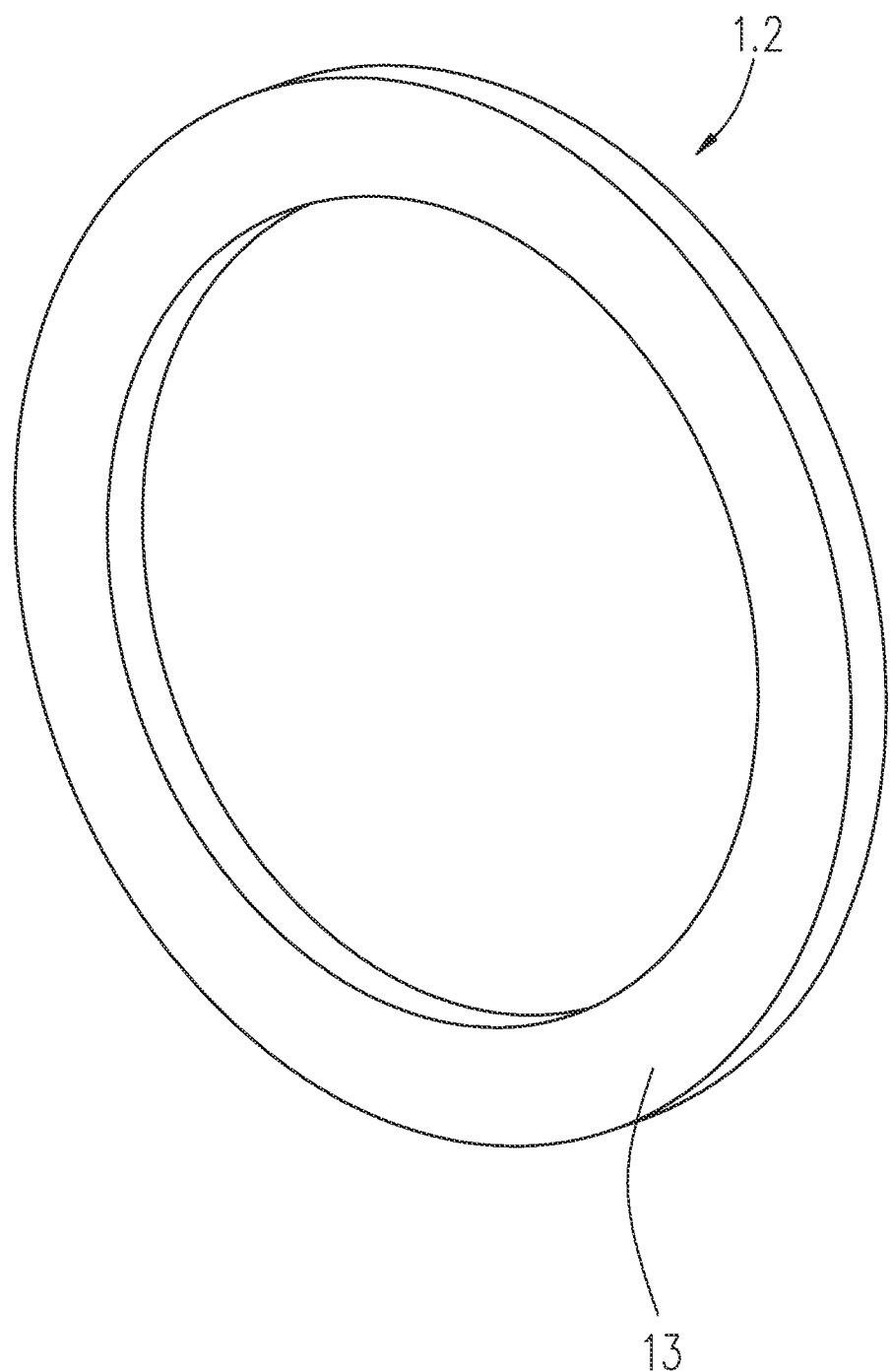
FIG. 16 shows the second cage part of the cage of FIG. 14.

FIG. 14 shows a further exemplary embodiment of a ball bearing according to the invention, in which the same reference signs for the corresponding components are used as before. In contrast to the previous exemplary embodiments, the second cage part 1.2 is designed as a flat, disk-shaped circular ring. The first cage part 1.1 again has a base ring 1.1.1 closed in the circumferential direction around the axis of rotation of the ball bearing and axial webs 1.1.2 standing thereon in the axial direction, i.e. in the direction of the axis of rotation, spaced apart from one another in the circumferential direction and forming ball pockets 1.1.3 between them. As can be seen in particular from FIGS. 15 and 16, the contact surface 13 of the second cage part 1.2 is flat and rests on the likewise flat end faces 14 of the axial webs 1.1.2 of the first cage part 1.1.

Such a cage 1 can be produced, for example, by laser transmission welding of the two cage parts 1.1 and 1.2. Preferably, the second cage part 1.2, which is correspondingly thinner in the axial direction, is made at least partially or completely of a laser-transparent material, whereas the first cage part 1.1 or its material absorbs the laser beam at least at the end faces 14 of the axial webs 1.1.2.

List of Reference Signs
1 Cage
1.1. First cage part
1.1.1 Base ring
1.1.2 Axial web
1.1.3 Ball pocket
1.2 Second cage part
2 Ball
3 Guide surface
4 Energy director
5 Recess
6 Radial projection
7 Radial recess
8 Contact surface
9 Contact surface
10 Bearing inner ring
11 Bearing outer ring
12 Rim
13 Contact surface
14 End face
15 Axial web
16 Axial projection
20 Sonotrode
21 Ultrasonic welding device

The invention claimed is:

1. A ball bearing comprising:
a cage; and
a plurality of balls held in the cage, wherein the plurality of balls are arranged one behind the other and at a distance from one another in a circumferential direction about an axis of rotation of the ball bearing;
wherein the cage is assembled from at least two or exactly two cage parts which are joined to one another in a materially bonded manner by welding and/or bonding and completely enclose the plurality of balls in a circumferential surface extending around the axis of rotation;
wherein a first cage part is designed as a snap cage having axial webs which project in the direction of the axis of rotation from a closed base ring and form ball pockets between them, wherein the first cage part encloses the plurality of balls along their outer circumference by more than 180°, holds the plurality of balls positively while forming an undercut and limits displacement of the plurality of balls within the circumferential surface in the direction of the at least one other second cage part.

2. The ball bearing according to claim 1, wherein the cage parts are joined together by ultrasonic welding.

3. The ball bearing according to claim 2, wherein one of the cage parts has axial projections and/or energy directors which engage in recesses in the other cage part wherein the recesses form melt pools for the material melted by the ultrasonic welding.

4. The ball bearing according to claim 1, wherein the cage parts are connected to each other by laser beam penetration welding.

5. The ball bearing according to claim 1, wherein only the first cage part has guide surfaces for the plurality of balls, against which the plurality of balls rest directly, at least temporarily.

6. The ball bearing according to claim 1, wherein the first cage part and at least a second cage part have guide surfaces for the plurality of balls, against which the plurality of balls rest directly at least temporarily, wherein the guide surfaces in the first cage part are larger than the guide surfaces in the second cage part and extend by more than 180° along the outer circumference of the respective one of the plurality of balls.

7. The ball bearing according to claim 1, wherein the second cage part is held positively in the first cage part in the circumferential direction about, the axis of rotation and in the radial direction to the axis of rotation, and/or the first cage part is held positively in the second cage part in the circumferential direction about the axis of rotation and in the radial direction to the axis of rotation.

8. The ball bearing according to claim 7, wherein the first cage part has radial projections which engage in radial recesses in the second cage part, and/or the second cage part has radial projections which engage in radial recesses in the first cage part.

9. The ball bearing according to claim 7, wherein the first cage part abuts with a radially outer or radially inner contact surface against a radially inner or radially outer contact surface of the second cage part.

10. The ball bearing according to claim 7, wherein the first cage part rests with contact surfaces extending in the direction of the axis of rotation and obliquely to the radial direction on opposite contact surfaces of the second cage part.

11. The ball bearing according to claim 1, wherein the first cage part extends along the entire extension of the cage in the direction of the axis of rotation and forms an uninterrupted inner rim guide or outer rim guide.

12. The ball bearing according to claim 1, further comprising:
a bearing inner ring and a bearing outer ring, each forming a raceway on which the plurality of balls roll, wherein the ball bearing is designed as a radial bearing or radial-axial bearing.

13. The ball bearing according to claim 12, wherein the ball bearing is designed as a deep groove ball bearing having two rims on the bearing inner ring and two rims on the bearing outer ring.

14. The ball bearing according to claim 12, configured to perform:
positioning of the plurality of balls on the raceways between the bearing inner ring and the bearing outer ring;
subsequent insertion of the first cage part in the direction of the axis of rotation of the ball bearing, wherein the axial webs are pushed respectively between two of the plurality of balls arranged adjacent to one another in the circumferential direction and the plurality of balls snap into place in the ball pockets; and
subsequent joining of the first cage part and the second cage part against each other in the direction of the axis of rotation and joining the first cage part and the second cage part by welding and/or bonding.

15. The ball bearing according to claim 14, wherein the first cage part and the second cage part are joined to each other by ultrasonic welding.

16. The hall bearing according to claim 14, wherein the first cage part and the second cage part are joined to each other by laser transmission welding.

\* \* \* \* \*